United States Patent [19]

Mestais et al.

[11] Patent Number: 5,371,362
[45] Date of Patent: Dec. 6, 1994

[54] NUCLEAR DETECTION PROCESS WITH BASE POTENTIAL CORRECTION AND CORRESPNDING APPARATUS (PARTICULARLY A GAMMA-CAMERA)

[75] Inventors: Corinne Mestais, Brignoud; Bernard Thevenin, St. Egreue, both of France

[73] Assignee: Commissariat A L'Energie Atomique, Paris, France

[21] Appl. No.: 791,406

[22] Filed: Nov. 14, 1991

[30] Foreign Application Priority Data

Nov. 21, 1990 [FR] France .................. 90 14532

[51] Int. Cl.$^5$ ................ G01D 18/00; G12B 13/00
[52] U.S. Cl. ................ 250/252.1; 250/336.1
[58] Field of Search .............. 250/252.1 R, 336.1

[56] References Cited

U.S. PATENT DOCUMENTS

| 4,078,178 | 3/1978 | Lowes | 250/336 |
| 4,386,404 | 5/1983 | Knoll et al. | 364/414 |
| 4,424,446 | 1/1984 | Inbar et al. | 250/363 S |

FOREIGN PATENT DOCUMENTS 2546632  11/1984  France .
2552552  3/1985   France .

Primary Examiner—Paul M. Dzierzynski
Assistant Examiner—David V. Bruce
Attorney, Agent, or Firm—Oblon, Spivak, McClelland, Maier, & Neustadt

[57] ABSTRACT

A nuclear detection process and an apparatus therefore, including base potential correction and corresponding apparatus in which the base potential is measured by establishing a histogram of the values of the detected pulses and the value of the abscissa of the first peak of the histogram is determined and is subtracted from the values of the detected pulses.

15 Claims, 3 Drawing Sheets

NUCLEAR DETECTION PROCESS WITH BASE POTENTIAL CORRECTION AND CORRESPNDING APPARATUS (PARTICULARLY A GAMMA-CAMERA)

BACKGROUND OF THE INVENTION

1. Field of the Invention

The present invention relates to a nuclear detection process with base potential correction and to a corresponding apparatus. The apparatus can e.g. be a gamma-camera or spectrometer, or any other apparatus serving to measure a characteristic of a nuclear radiation. In the first case, the invention is applied to the medical field, where gamma-cameras are used for producing images of organs with a view to making a diagnosis. The gamma-camera is preferably of the scintillation, ANGER type, whereof U.S. Pat. No. 3,011,057 describes the fundamental operation and the realization means.

2. Description of the Background

Gamma-cameras are used in nuclear medicine for displaying the distribution within an organ of molecules labelled by a radioactive isotope previously injected into the patient. A gamma-camera generally comprises a collimator for limiting the angle of incidence of the gamma photons emitted by the organ to be studied, a scintillation crystal for transforming the gamma photons into light photons or scintillations and a network of photomultiplier tubes, which transform the scintillation into electrical pulses called "electrical contributions" of the tubes. A gamma-camera also comprises electronic circuits for producing, on the basis of the electrical contributions of the tubes, X and Y coordinate signals indicating the location where the scintillation has taken place, as well as a validation signal V when the amplitude of the scintillation belongs to a predetermined energy band.

This detection chain can be followed by a display system generally incorporating an oscilloscope controlled by X and Y coordinate signals and by the validation signal V for displaying by a spot of light or scan spot on the screen the impact point of the gamma photon on the crystal. The display system can optionally incorporate a photographic device for forming an image of the organ observed, by the integration of a large number of light points produced on the screen. Moreover, it can comprise a digital image processing device, which can be used for reconstructing images of sections of organs, in order to produce tomograms thereof. In the latter case, image reconstruction algorithms identical to those used in tomo-scanning are utilized.

Among other things a gamma-camera must have a good spatial resolution (i.e. a capacity to distinguish small radioactive sources which are close together), a good counting rate response (i.e. a capacity to process a large number of events per time unit) and an image quality independent of the energy of the considered isotope. The spatial resolution is dependent on the accuracy of the calculation of the X and Y coordinates. The quality of the production of these coordinates is essentially dependent on the physical laws governing the operation of the different parts of the gamma-camera. Thus, the interaction of a gamma photon with the crystal gives rise to a light scintillation, whose intensity decreases exponentially with time. The time constant of this decrease is a characteristic of the scintillation crystal used. For a thalium-activated sodium iodide crystal (NaI, Tl), it is approximately 300 nanoseconds. For a given energy of the incident gamma photon, the number of light photons of the scintillation obeys the statistical POISSON'S law. This scintillation is seen by several multiplier tubes simultaneously. The light photons forming this scintillation remove photoelectrons from the photocathodes of the photomultiplier tubes. The number of photoelectrons removed also obeys the POISSON'S statistical law for a given scintillation. This means that the electrical contribution of a photomultiplier tube receiving a scintillation has an amplitude, whose value follows a POISSON'S statistical distribution. The mean value of this amplitude is a function of the energy of the incident light photons.

As a scintillation is seen by several photomultiplier tubes simultaneously, the determination of the location of this scintillation on the crystal, which itself represents the emission point of the exciting gamma photon, is obtained by calculating the location of the barycentre of the electrical contribution supplied by the photomultiplier tubes. In accordance with the ANGER method referred to hereinbefore, this calculation takes place by injecting the electrical contributions through an array of resistance matrixes. The values of the latter are a function, for so-called pinpointing matrixes, of the positions of the photomultiplier tubes to which they are connected. The analog electrical signals obtained $x^+$, $x^-$, $y^+$, $y^-$, called "weighted pulses" translate the position of the scintillation with respect to the X and Y axes.

For a given scintillation, the most difficult problem to solve consists of determining as accurately as possible the integral of the barycentre of the electrical contributions on a period of approximately three times the decay time constant of the scintillations of the scintillation crystal. The integration time is dependent on the time constant of the crystal. The accuracy of the measurement is subject to error due to the statistical POISSON'S fluctuation. Thus, the standard variation of the amplitude fluctuation of the contributions according to POISSON'S statistics is inversely proportional to the square root of the number of photoelectrons removed. Thus, the longer the integration (up to three times the decay time constant of the scintillation) the larger the number of photoelectrons taken into account, the smaller the standard variation and therefore the more accurately the mean value of this contribution is evaluated.

Thus, the operation of calculating the location of the barycentre is a linear operation, so that it is more economic to carry out this integration at the output of the each of the resistance matrixes of the array on weighted pulses. The integration time is directly linked with the quality of the spatial resolution of the gamma-camera and this quality is obtained to the detriment of the counting rate, i.e. to the number of events per second which are taken into account.

This integration operation is subject to certain difficulties. The most important is the presence of permanent d.c. voltages super imposed on the weighted pulses and which, introduced into integrators, falsify the value of the signal supplied by them in proportion to the length of the integration time. The origin of these d.c. voltages is mainly the variable gain amplifiers interposed between each resistance matrix and a corresponding integrator. These variable gain amplifiers are used for two reasons. Firstly they are used for choosing the energy range to be studied and then they permit an amplitude matching of the weighted pulses to the operating dynamics of the integrators used. These disturbing d.c. voltages can also have other origins and can in particular be due to a scintillation stacking effect.

The electrical potential resulting from these d.c. voltages shifts is what is commonly called the base potential of the integrators. U.S. Pat. No. 3,984,689 granted on Oct. 5, 1976 to Roger E. ARSENAUX indicates that at high radioactivity levels, i.e. high counting rates, e.g. exceeding 100,000 events per second, capacitive couplings, which might have been considered for eliminating the said d.c. voltages, must be proscribed. Thus, the presence of such capacitive couplings leads to a displacement of the base potential essentially linked with the repeated appearance at very high speed of scintillations. These capacitances have the consequence of reconstituting a d.c. component dependent on the counting rate. However, the accuracy levels presently required with respect to the calculation of the coordinate signals makes it necessary for the erratic amplitude variations of the signals to remain below 1/1000th of their amplitude.

FR-A-2 546 632 proposes solving the problems created by the introduction of a capacitive coupling in the chain, whilst restoring the base potential prior to the appearance of weighted pulse to be taken into account. According to this document, the measurement of the base potential is only authorized after the end of a period where there have been no pulses and the base potential is restored prior to a new integration during the end of said period.

The disadvantage of this procedure is that when the camera is used at a high counting rate, i.e. when the gamma photon emission activity is high, the pulse-free periods are too short to enable the base potential measurement to take place under satisfactory conditions. This leads to the presence of a d.c. component during the integration and falsifies the result.

SUMMARY OF THE INVENTION

The object of the present invention is to obviate problems associated with measurement of the base potential. It therefore proposes a process where in very simple manner measurement takes place of the base potential, which makes it possible to correct the signal to be processed as a function thereof. This result is obtained due to the production of a histogram of the samples of the signal (i.e. on determining the statistical distribution of the amplitudes of these samples). The histogram obtained has a first peak corresponding to the probability of samples occurring having the base potential as the amplitude. The measurement of the abscissa of this peak directly supplies the mean base potential value. It is then merely necessary to subtract this value from the signal prior to digital integration.

More specifically, the present invention relates to a process for the detection of nuclear radiation, in which a detection signal is formed, which is constituted by voltage pulses on which are superimposed a spurious voltage called the base potential, said signal is sampled, each sample is converted into digital form and the digital samples are processed in order to determine a characteristic of the detected nuclear radiation, characterized by the measurement of the base potential by producing a histogram of the digital samples, which are formed continuously and rapidly, and by measuring within the said histogram the abscissa of the first activity peak, which gives the value of the base potential with which the detection signal is corrected, prior to the processing of the samples, by subtracting therefrom the value of the thus measured base potential.

The present invention also relates to a nuclear radiation detection apparatus performing said process. This apparatus comprises means for detecting a nuclear radiation supplying a detection signal formed by voltage pulses on which are superimposed a spurious voltage called a base potential, means for sampling an analog-digital conversion of the detection signal and processing means of the sample able to determine a characteristic of the detected nuclear radiation, characterized in that it also comprises means for measuring the base potential incorporating means, positioned after the sampling and analog-digital conversion means, in order to produce a histogram of the samples, which are formed in a continuous and rapid manner, and means for measuring, within the said histogram, the abscissa of the first activity peak, which gives the value of the base potential and correction means positioned upstream of the processing means for subtracting the base potential value from the samples to be processed.

When the detection means and the sampling and digital conversion means comprise several channels in parallel, the base potential measuring means can either be split up between the different channels by multiplexing, or can be located on each channel.

In an advantageous embodiment, and for bringing the analog-digital conversion means under better operating conditions, the apparatus also comprises means for the analog shifting of the detected signal and which are controlled by the base potential measuring means.

The apparatus according to the invention can advantageously be a gamma-camera, in which case the characteristic to be determined is the position of a gamma radiation.

BRIEF DESCRIPTION OF THE DRAWINGS

The invention is described in greater detail hereinafter relative to non-limitative embodiments and the attached drawings, which show the following.

DETAILED DESCRIPTION OF THE PREFERRED EMBODIMENTS

Figure 1:
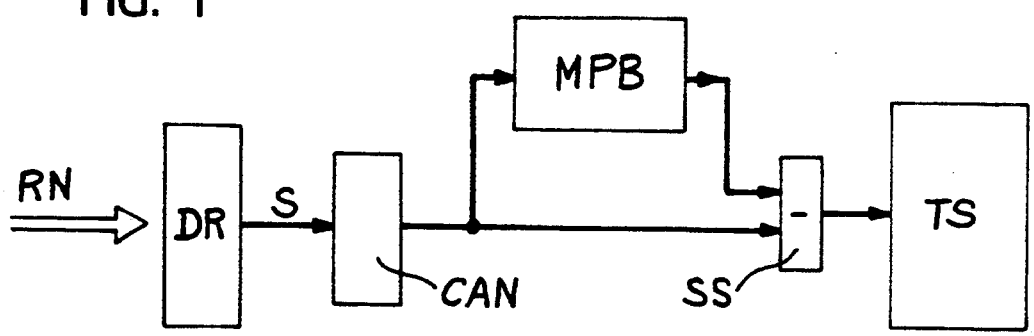
FIG. 1 The block circuit diagram of an apparatus according to the invention in its most general construction.

FIG. 1 shows a radiation detector DR receiving and detecting a nuclear radiation RN and supplying a detection signal S. The signal is sampled and converted into digital form by the converter CAN, which operates continuously and rapidly. It is continuous in the sense that it samples the entire signal (i.e. not only the pulses, but also the part between the latter, which is precisely the base potential which it is wished to measure). It is fast in the sense that it delivers several samples per pulse. The apparatus shown also comprises means for processing the signal TS.

According to the invention, the apparatus also comprises base potential measuring means MPB. These means are connected to the converter CAN and can produce a histogram of the samples formed by the converter CAN and is also able to measure, in said histogram, the abscissa of the first activity peak, which gives the value of the base potential.

The apparatus also comprises correction means, in practice a subtractor SS, positioned upstream of the signal processing means and connected to the means MPB and CAN for deducting the base potential value from the samples to be processed.

Figure 2:
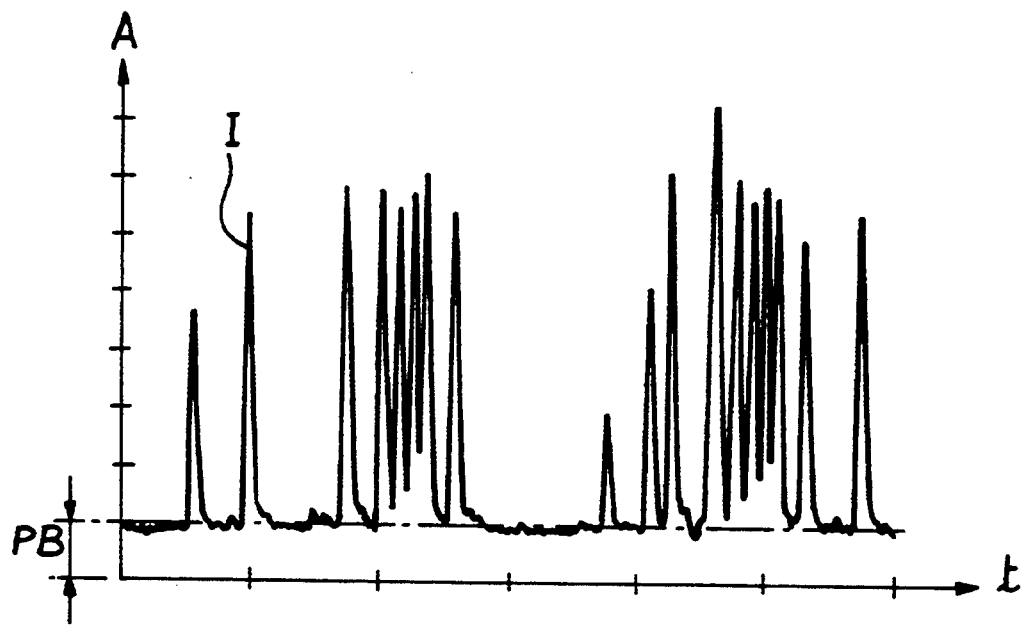
FIG. 2 An example of a signal to be processed by the invention.
Figure 3:
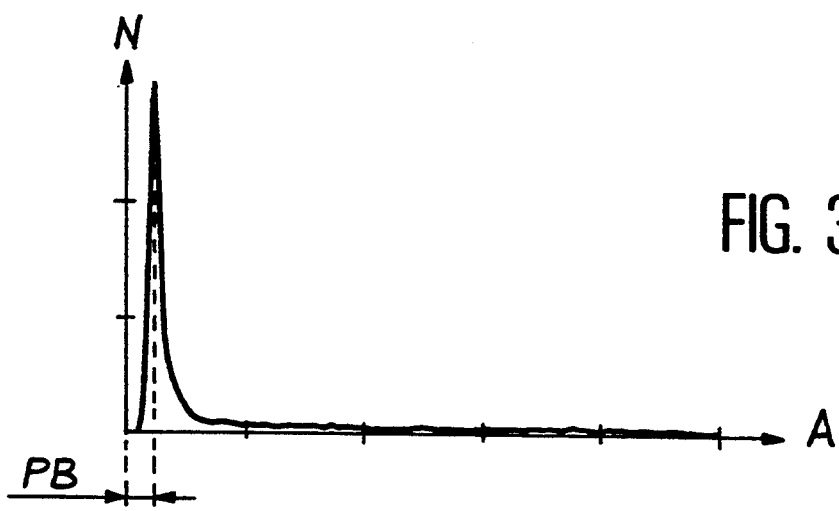
FIG. 3 An example of a histogram used for determining the base potential.

The operation of said apparatus and in particular the base potential measuring means can be illustrated with the aid of FIGS. 2 and 3.

FIG. 2 shows in the particular case of a gamma radiation detected by a detector such as is found in a gamma-camera, pulses I superimposed on a base potential PB as a function of time. It is this type of signal which is rapidly sampled and coded. The thus formed samples, or optionally a part 1/n thereof if this is sufficient, are processed in order to produce a histogram, which generally has the configuration shown in FIG. 3. In such a histogram, the amplitudes are plotted on the abscissa and the number of pulses having a given amplitude on the ordinate. A clearly marked peak is then obtained, which corresponds to amplitude samples equal to the base potential. The abscissa of this peak immediately gives the amplitude of the base potential.

Figure 4:
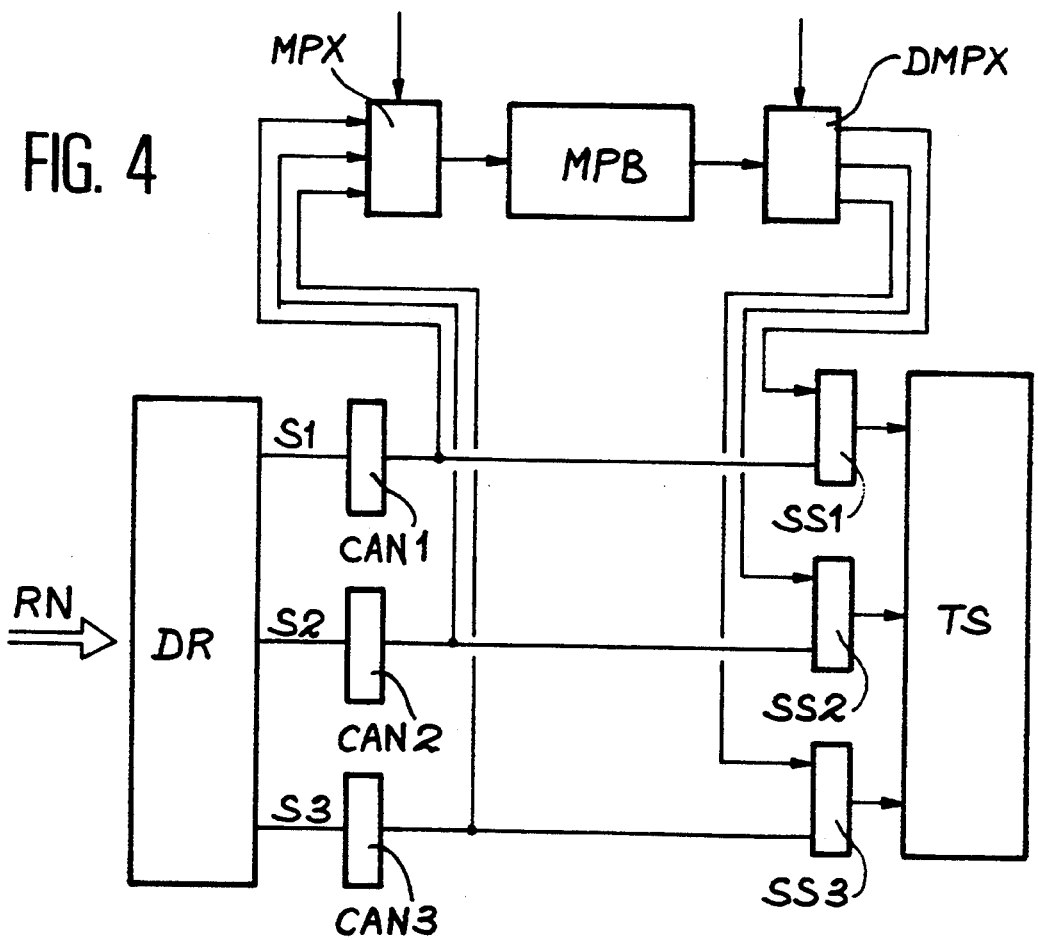
FIG. 4 An apparatus according to the invention in a multiplexing mode.

When the apparatus comprises several processing channels, which is often the case in gamma-cameras, the base potential measuring means MPB can be associated with each of these channels (as will be explained hereinafter relative to FIG. 6), but can also be unique and divided up between all the channels, as illustrated in FIG. 4. FIG. 4 shows three channels, where three signals S1, S2 and S3 are converted by three means CAN1, CAN2 and CAN3. The measuring means of the three base potentials relative to these three channels are constituted by a single circuit MPB preceded by a multiplexer MPX and followed by a demultiplexer DMPX. The three values of the base potentials are successively addressed at three subtractors SS1, SS2 and SS3 for correcting the three signals prior to processing.

Figure 5:
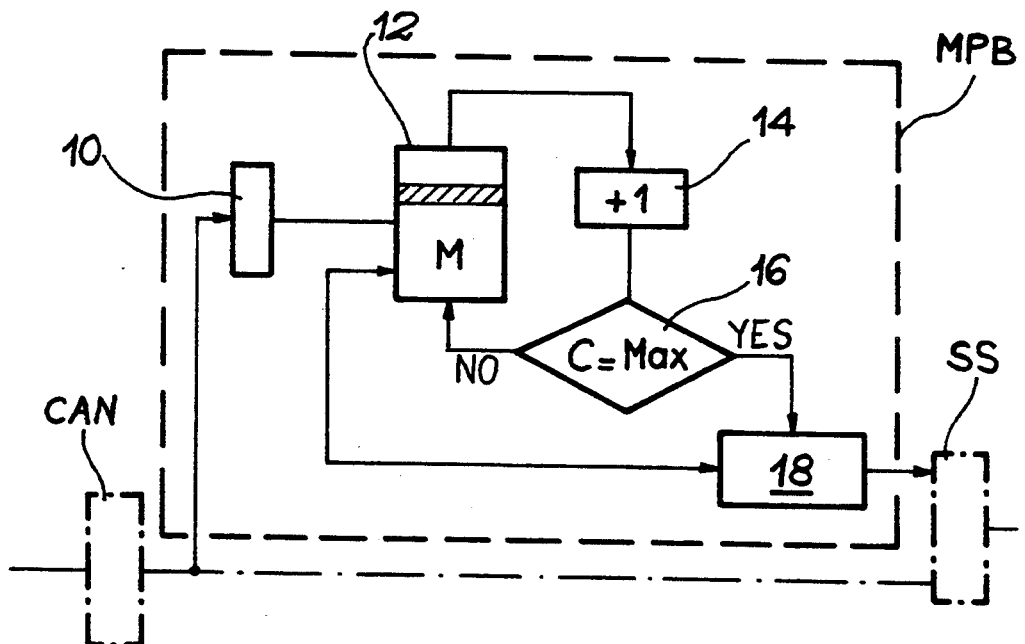
FIG. 5 An embodiment of the base potential measuring means.

Whatever the variant of the apparatus, the base potential measuring means can assume various forms. FIG. 5 shows a special embodiment of these apparatuses, which comprise an address register 10 connected to the analog-digital conversion means CAN, a memory 12, whereof each cell is addressed by said register, a means 14 able to increment by one unit the content of each cell whenever it is addressed, a comparator 16 determining the instant when the content C of one of the cells reaches a given maximum value and a means 18 which can assume different forms. According to a first embodiment, the means 18 is of the latch type, which reads the address of the first cell having reached the maximum and which gives the abscissa of the peak of the histogram, i.e. the base potential value. In a second embodiment, the means 18 is a central processing unit able to read the contents and addresses of the cells of the memory and carry out the calculation of the barycentre of the contents of the addresses (on the basis of a content predetermined by a threshold). Therefore the abscissa of this barycentre gives the base potential value.

It is clear that within the definition given by the invention, the expression "abscissa of the peak" can signify the abscissa of the maximum of the peak or the abscissa of the bary-centre of the peak. In general terms, it is an abscissa making it possible to pinpoint the peak in the histogram.

Figure 6:
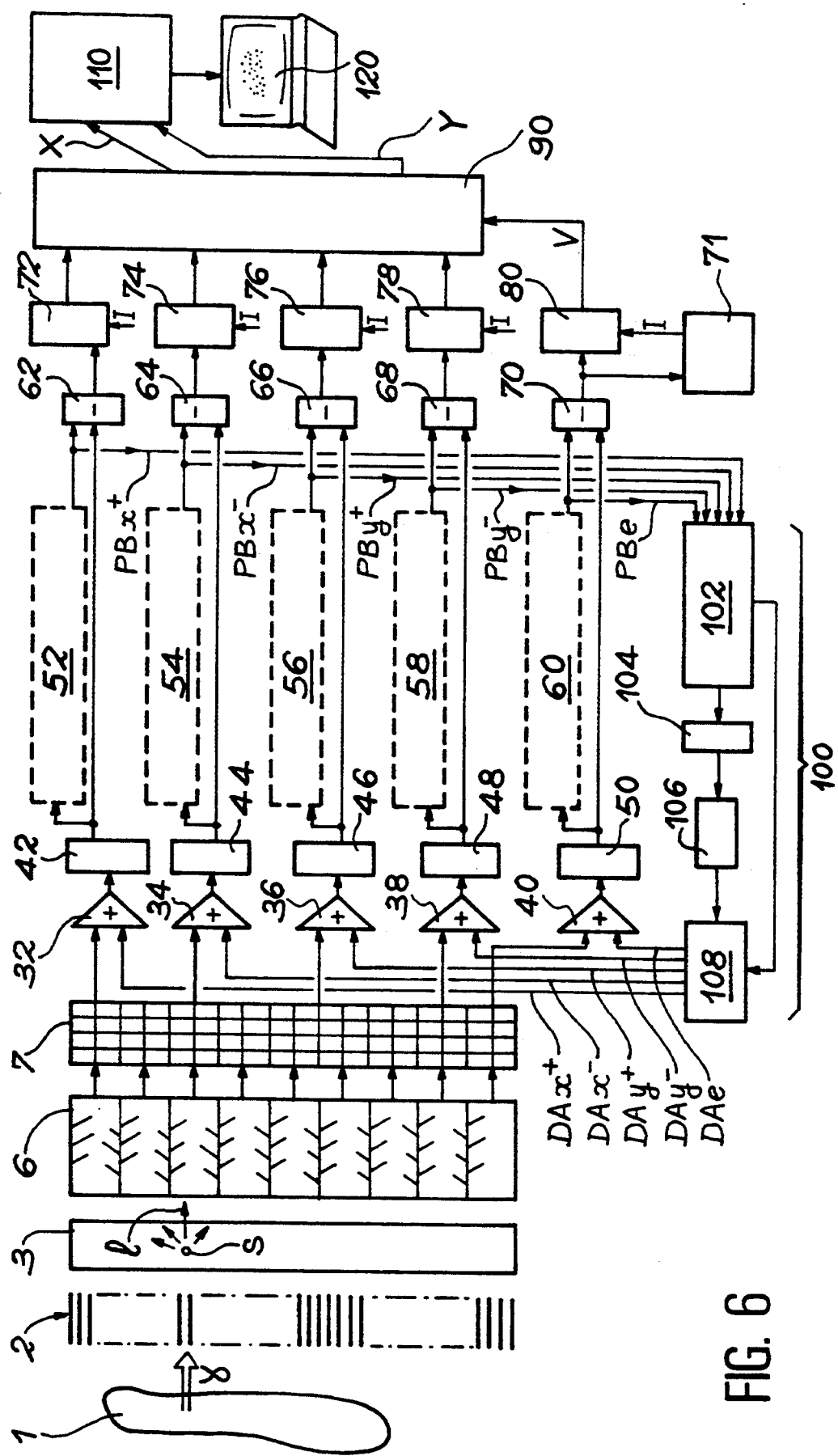
FIG. 6 A gamma-camera according to the invention.

Finally, FIG. 6 illustrates an application of the invention to the production of a gamma-camera for pinpointing the gamma radiation from the organ 1 of a patient. In the manner shown, the said gamma-camera comprises:
a radiation collimator 2;
a scintillating material layer 3 able to produce a light radiation 1 per scintillation s;
photodetection means 6 positioned facing the scintillating layer and supplying electrical signals, whereby said means can be photomultipliers;
arrays of weighting resistors 7 receiving the electrical signals delivered by the photodetection means 6 and supplying four electrical signals $x^+$, $x^-$, $y^+$, $y^-$ in pulse-like form, the two signals $x^+$ and $x^-$ translating the position of the scintillation s relative to a first axis X and the two signals $y^+$ and $y^-$ translating the position of said scintillation relative to a second axis Y;
four offset circuits 32, 34, 36, 38 receiving the signals $x^+$, $x^-$, $y^+$, $y^-$ and four analog offset voltages $DAx^+$, $DAx^-$, $DAy^+$ and $DAy^-$, whose formation will be defined hereinafter;
four fast analog-digital convertors 42, 44, 46, 48 receiving the four signals $x^+$, $x^-$, $y^+$, $y^-$ after shifting;
four means 52, 54, 56, 58 for measuring the base potential relative to the four signals $x^+$, $x^-$, $y^+$, $y^-$, said four means having their input respectively connected to the four analog-digital convertors 42, 44, 46, 48 and supplying the four base potentials $PBx^+$, $PBx^-$, $PBy^+$, $PBy^-$;
four subtractors 62, 64, 66, 68 having two inputs respectively connected to the analog converter and to the output of the base potential measuring means;
four digital integrators 72, 74, 76, 78 connected to the four subtractors, said four digital integrators supplying four digital weighted sums $X_N^+$, $X_N^-$, $Y_N^+$, $Y_N^-$;
a calculating circuit 90 receiving said weighted sums and supplying two signals X and Y defining the position of the scintillation;
a display means 120 having an image memory 110.
According to an advantageous variant, the gamma-camera also comprises:
a fifth offset circuit 40 receiving a signal representing the energy e of the radiation;
a fifth analog-digital converter 50;
a fifth base potential measuring means 60 relative to the energy signal e;
a fifth subtractor 70 having a first input connected to the fifth means 50 supplying the energy signal and a second input connected to the fifth base potential measuring means 60;
a circuit 71 for detecting the maximum of the signal supplied by the fifth subtractor, said circuit supplying a validation signal I of all the integrators 72, 74, 76, 78;
a fifth digital integrator 80 also validated by the preceding circuit 71 and supplying a signal $E_N$, which is taken as the validation signal V of the digital calculating means 90.

Offset circuits 32, 34, 36, 38 and 40 are supplied by analog voltages respectively DAx+, DAx−, DAy+, DAy− and DAe supplied by the means 100. Said means comprise a central processing unit 102 having five inputs connected to the outputs of the five measuring circuits of the base potential values 52, 54, 56, 58 and 60, said inputs receiving the said values PBx+, PBx−, PBy+, PBy− and PBe in digitally coded form. This unit 102 calculates the shifts to be given to the incident signal for bringing the analog-digital converters under better operating conditions (accuracy and dynamics). These shifts are sequentially transmitted to a register 104 and then converted into analog form by a digital-analog converter 106 and addressed to a multiplexer 108 having one input and five outputs respectively connected to the five offset circuits 32, 34, 36, 38 and 40 for the application of five analog offset voltages DAx+, DAx−, DAy+, DAy− and DAe.

The X and Y position signals can be obtained from the digital integrated signals $X_N^+$, $X_N^-$, $Y_N^+$ and $Y_N^-$ by the following formulas:

$$X = \frac{X_N^+ - X_N^-}{X_N^+ + X_N^-} \quad Y = \frac{Y_N^+ - Y_N^-}{Y_N^+ + Y_N^-}$$

as described in FR-A-2 615 959.

We claim:

1. A process for the detection of nuclear radiation, comprising the steps of:
   forming a detection signal comprising voltage pulses superimposed on a spurious voltage called the base potential;
   sampling said detection signal;
   converting the samples to digital form;
   measuring the base potential by producing a histogram of number of the voltage pulses on the y-axis versus amplitude of the voltage pulses on the x-axis;
   determining the amplitude of a first peak along the x-axis of the histogram, wherein the amplitude of the first peak of the histogram corresponds to the base potential;
   and subtracting the amplitude at which the first peak of the histogram occurs from the amplitudes of the voltage pulses.

2. An apparatus for the detection of nuclear radiation, comprising:
   means for detecting nuclear radiation and generating a detected signal indicative of the nuclear radiation, but on which signal there is superimposed a spurious voltage called a base potential;
   means for measuring the base potential, comprising means for determining the number of detected signals as a function of amplitude of the detected signals and means for determining a detected amplitude value corresponding to the amplitude of the function at which the first peak in the number of detected signals occurs;
   means for subtracting the detected amplitude value from the value of the detected signals, thereby subtracting the value of the base potential from the detected signals for the nuclear radiation.

3. An apparatus according to claim 2, further comprising:
   means for converting the detected signals from analog to digital form.

4. An apparatus according to claim 3, wherein the means for detecting and the means for converting from analog to digital form comprise several channels that are in parallel with one another; and
   further comprising means for multiplexing and demultiplexing the parallel channels, said means for multiplexing connected between the parallel channels and the means for measuring the base potential.

5. An apparatus according to claim 2, wherein the detection means and the means for converting from analog to digital form comprises several parallel channels; and
   further comprising a plurality of means for measuring the base potential, each of the plurality of the means for measuring the base potential coupled to one of the parallel channels.

6. An apparatus according to claim 2, further comprising means for subtracting an analog value from the signal detected by the means for detecting, wherein said means for subtracting an analog value is controlled by a signal from the means for measuring the base potential.

7. An apparatus according to claim 3, wherein the base potential measuring means comprises an address register that is connected to the means for converting from analog to digital form, a memory, each cell of the memory being addressed by the address register, a means for incrementing by one unit at a time, the content of each cell whenever that cell is addressed by the address register, a means for determining the instant in time when the content of one of the cells reaches a predetermined maximum value, and means for reading the address of the cell when it has reached the predetermined maximum value, wherein said address may be used for the abscissa of a histogram peak, the peak of the histogram defining the base potential value.

8. An apparatus according to claim 3, wherein the means for measuring the base potential comprises an address register that is connected to the means for converting from analog to digital form, a memory, each cell of the memory being addressed by the address register, a means for incrementing by one unit at a time the content of each cell of the memory whenever that cell is addressed, means for determining the time when the content of one of the cells of the memory reaches a predetermined maximum value, and means for reading the contents and addresses of the cells of the memory and determining the barycenter of the addresses allocated according to content, wherein the abscissa of the baricenter provides the base potential value.

9. An apparatus according to claim 3, wherein the means for detecting comprises a gamma-camera.

10. A gamma-camera, comprising:
    a layer of scintillating material for receiving gamma radiation and for producing light in response thereto;
    photodetection means for detecting a photo signal, said photodetection means being positioned along a plane opposing the layer of scintillating material so as to provide position sensitive detection of photons emitted by the layer of scintillating material;
    an array of weighting resistors that are connected to outputs of the photodetection means and which receive electrical signals supplied by those outputs, and which supply four electric signals X+, X−, Y+, Y−, in pulse form, in which the two signals X+, X−, correspond to positions of scintillation relative to a first axis (the X axis) and the two signals Y+, Y− correspond to the positions of scintillation relative to a second axis (the Y axis), the first and second axes being perpendicular to one another;

four fast analog to digital convertors that are connected to outputs of the arrays of weighting resistors so that they each receive one of the X+, X−, Y+, Y− signals and convert those signals to digital form;

four means for measuring the base potential, each one of the four means for measuring the base potential being connected to an output of one of the four fast analog to digital converters, each of the four means for measuring the base potential measuring the base potential relative to one of the four signals X+, X−, Y+, Y−;

four subtractors, each of which has two inputs, each of the four subtractors being connected to one of the analog to digital converters by one of its two inputs and to one of the outputs of the four means for measuring the base potential, wherein the function of each subtractor is to subtract the base potential measured by the means for measuring the base potential to which it is connected from the value provided by the analog to digital converter to which it is connected;

four digital integrators, each digital integrator connected to an output of one of the four subtractors, each of the four digital integrators supplying as an output a digital weighted sum corresponding to a weighted sum of the received signals;

a circuit for calculating the position of a scintillation, which is connected to the outputs of the four digital integrators and determining the position of the scintillation based upon the weighted sums provided by those digital integrators.

11. A gamma-camera according to claim 10, further comprising a display means coupled to the circuit for calculating, for displaying the contents of an image memory.

12. A gamma-camera according to claim 10, further comprising:
a fifth means for supplying a digital signal corresponding to the energy of detected gamma radiation;
a fifth means for measuring a base potential from the digital signal corresponding to the energy of the gamma radiation;
a fifth subtractor having a first input connected to the fifth means for supplying and a second input connected to the fifth means for measuring;
a fifth digital integrator connected to an output of the fifth subtractor, for supplying a signal to the circuit for calculating the position of the scintillation thereby controlling whether an output of the circuit for calculating the position of the scintillation is sent to the image memory.

13. A gamma-camera according to claim 12, further comprising a circuit for detecting a maximum value of the signal supplied by the fifth subtractor, said circuit for detecting the maximum value being connected to the fifth subtractor and to all of the integrators, and supplying a validation signal for all of the integrators.

14. A gamma-camera according to claim 10, wherein the photodetection means comprises photomultipliers.

15. A gamma-camera according to claim 10, further comprising a gamma radiation collimator that is disposed on the opposite side of the scintillation material from the photodetection means.

* * * * *

UNITED STATES PATENT AND TRADEMARK OFFICE
CERTIFICATE OF CORRECTION

PATENT NO. : 5,371,362
DATED : December 6, 1994
INVENTOR(S) : Corinne MESTAIS, et al.

It is certified that error appears in the above-indentified patent and that said Letters Patent is hereby corrected as shown below:

On the title page, Item 54 and Column 1, Lines 2-5, the title is listed incorrectly. It should read:

--NUCLEAR DETECTION PROCESS WITH BASE POTENTIAL CORRECTION AND CORRESPONDING APPARATUS (PARTICULARLY A GAMMA-CAMERA)--

Also, Item [75], the second inventor's residence should read:

--St. Egreve--

Signed and Sealed this

Seventh Day of March, 1995

*Attest:*

BRUCE LEHMAN

*Attesting Officer*     *Commissioner of Patents and Trademarks*